Aug. 19, 1924.
A. BULBICK
1,505,540
RAILWAY BRAKE APPARATUS
Filed March 31, 1922
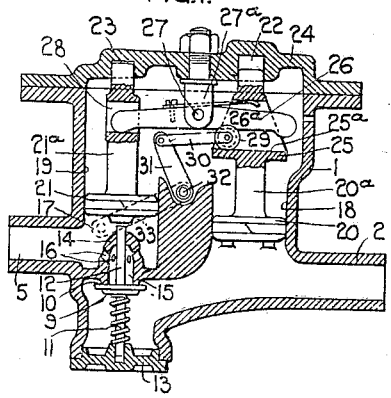
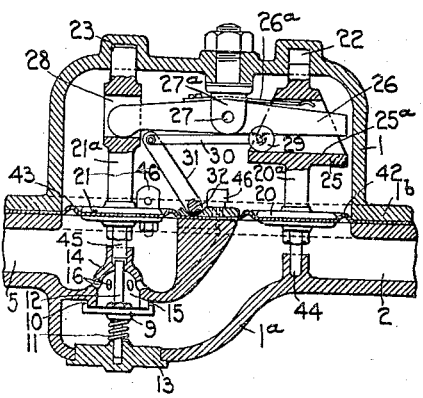
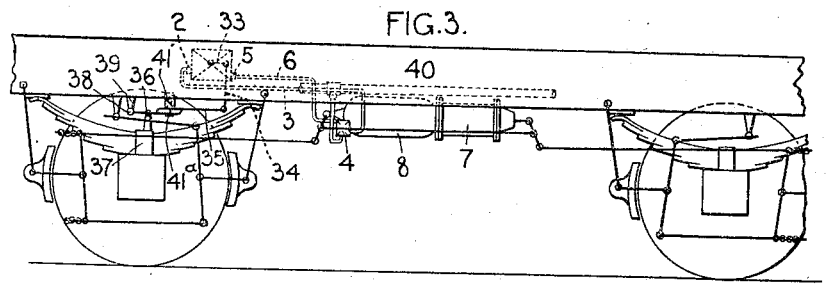
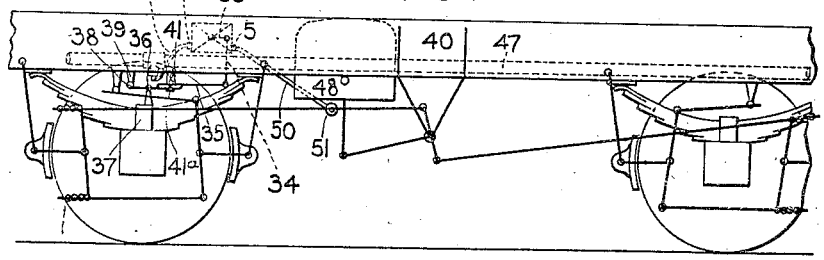
Inventor
Albert Bulbick
by Herbert W. Jenner
Attorney Patented Aug. 19, 1924.

1,505,540

UNITED STATES PATENT OFFICE.

ALBERT BULBICK, OF EASTLEIGH, ENGLAND.

RAILWAY BRAKE APPARATUS.

Application filed March 31, 1922. Serial No. 548,348.

*To all whom it may concern:*

Be it known that I, ALBERT BULBICK, a subject of the King of Great Britain and Ireland, residing at Eastleigh, Hampshire, England (whose post-office address is 76 The Crescent, Eastleigh, Hampshire, England), have invented certain new and useful Improvements in Railway Brake Apparatus; and I do hereby declare the following to be a full, clear, and exact description of the invention, such as will enable others skilled in the art to which it appertains to make and use the same.

As is known it is desirable, in order to provide for the most effective and economical braking of the vehicles of railway trains and the like, to provide means whereby the brakes shall be applied to the wheels of the vehicles with a force or pressure proportionate or approximately proportionate to the weight of the vehicle or of the vehicle and its load so that the ratio of brake power to the weight of a vehicle and its load is the same or approximately the same for empty, partly loaded and fully loaded vehicles for all applications of the brakes, i. e., whether only slight, or a moderate, or a full application of the brakes is to be made. In this way "hustling" of empty or relatively light vehicles by loaded or heavier vehicles in a train is avoided; and the skidding and consequent flatting of the wheels of vehicles is also avoided. With existing brake systems in which air (compressed air in the case of compressed air brake apparatus and atmospheric air in the case of vacuum brake apparatus) is admitted to the brake cylinders on the vehicles for applying the brake the same power or pressure is brought into play in the brake cylinders of both light and heavy vehicles in a train, with the result that "hustling" of the vehicles and flatting of the wheels takes place as well as waste of brake power owing to the amount of power employed for applying the brakes to empty or partly loaded vehicles being the same as that employed for applying the brakes to the heavier or fully loaded vehicles.

The present invention has for its object to provide and consists principally in a valve device whereby the amount of air pressure (compressed air in the case of compressed air brake apparatus and atmospheric air in the case of vacuum brake apparatus) admitted to the brake cylinders on the vehicles of a train is in the case of each vehicle regulated or determined by or according to the weight of the respective vehicle or of the vehicle and its load upon the bearing springs, so that the force or pressure with which the brakes are applied to the wheels of the respective vehicles shall be proportionate or approximately proportionate to the weight of the vehicle whether empty, partially loaded or fully loaded.

The invention further consists in a valve device through which air is admitted to the brake cylinder or cylinders on a vehicle, and means operatively combined with or connected to the said valve whereby the action of the valve is controlled, varied or determined by the weight of the vehicle or of the vehicle and its load upon the bearing springs so that the amount of air pressure admitted to the brake cylinder and consequently the force or power with which the brakes are applied is proportionate or approximately proportionate to the weight of the vehicle or of the vehicle and its load.

Further according to the invention the valve of the above-mentioned valve device is actuated through the medium of a piston or diaphragm arrangement adapted to be actuated both by the pressure of air admitted to the valve device and by the air pressure obtaining in the brake cylinder respectively for opening and closing the valve the action of the said piston or diaphragm arrangement and consequently the action of the valve being controlled, regulated or varied through the medium of a lever and means adjustable so as to vary the leverage of the said lever according to the weight of the vehicle or of the vehicle and its load upon the bearing springs.

Further according to this invention the above mentioned valve device comprises in combination a casing having an inlet adapted to be connected to the air pipe leading from the triple valve (in the case of compressed air brake apparatus) or from the train pipe (in the case of vacuum brake apparatus) to the brake cylinder, an outlet adapted to be connected with the piston chamber in the brake cylinder, a valve arranged so as to control communication between the said inlet to and outlet from the casing, a piston or pistons or a diaphragm or diaphragms within said casing, a lever mounted on a fixed fulcrum carried by the casing and adapted to be actuated by the movement of the said piston or pistons (or diaphragm or diaphragms) due to the pressure of the air acting upon the pressure area or areas of said piston or pistons, and means within the casing adapted to be actuated so as to vary the leverage of the said lever for the purpose of controlling or regulating the action of the valve for admitting air to and shutting off the admission of air from the brake cylinder, the construction and arrangements being such that whatever the amount of air pressure admitted to the said casing the amount of air pressure admitted to the brake cylinder by the action of the said valve is regulated or determined by the load on the bearing springs so that the force or power with which the brakes are applied will be proportionate or approximately proportionate to the weight of the vehicle or of the vehicle and its load.

Further according to this invention in the preferred embodiment thereof the above mentioned means for varying the leverage so as to control or regulate the action of the valve according to the load on the bearing springs is automatically actuated or set so as to alter the leverage, by increase and decrease in the weight of the load upon the bearing springs. In this embodiment of the invention the means for varying the leverage is preferably actuated or set through the medium of a suitable shock absorbing means adapted to prevent shocks and vibrations, due for instance to unevenness of the road, being transmitted to the said means for varying the leverage but permitting the steady or sustained movements due to loading or unloading of the vehicle to be transmitted to the said means.

The invention further consists in the valve devices and parts associated therewith constructed arranged and adapted to operate substantially as hereinafter described with reference to the accompanying drawings, for the purposes set forth.

In the accompanying drawings which illustrate by way of example alternative embodiments of the invention, Fig. 1 is a sectional elevation of a brake pressure regulating valve designed for use with air brake apparatus, and Fig. 2 is a similar view to Fig. 1 of a valve device designed for use with vacuum brake apparatus. Fig. 3 is a diagrammatic view showing, in side elevation the solebar or underframe of a railway vehicle fitted with compressed air brake apparatus, and shows the arrangement of the lever and rod connections to the pressure regulating valve device of Fig. 1 whereby the action of the valve is controlled by the load upon the bearing springs. Fig. 4 is a similar view to Fig. 3 but shows diagrammatically an application of the invention to a vehicle fitted with vacuum brake apparatus.

Like reference numbers indicate corresponding parts in the various figures of the drawings.

Referring to Fig. 1, 1 is a casing, which may be a casting, comprising the tubular air inlet 2 adapted to be connected, for instance by a suitable pipe connection 3 (Fig. 3) to the brake cylinder air supply port of the triple valve 4 which may be of the usual kind employed in the well known Westinghouse Air Brake system; 5 is the tubular outlet from the casing 1 said outlet being adapted to be connected, for instance by a suitable pipe connection 6 (Fig. 3) to the air inlet port of the brake cylinder 7, 8 (Fig. 3) being the usual auxiliary reservoir for the supply of compressed air to the brake cylinder 7 via the triple valve 4. 9 (Fig. 1) is a valve, in the example shown a circular plate or disc valve, which, as shown controls communication between the air inlet 2 in the casing 1 and the air outlet 5 leading from the casing to the brake cylinder the seat for the valve being provided in the casing on the part 10 thereof. The valve 9, as shown, is provided with rods or stems 11 and 12 the lower end of the rod 11 being guided in a suitable recess in the cap 13 screwed into an aperture in the bottom of the casing 1, and the rod 12 being guided at its upper end in the part 14 of the casing which part, as shown, is hollow and forms a chamber 15 from which a suitable number of ports 16 lead into the space 17 and communicate via the outlet 5 with the brake cylinder. 18 and 19 are piston chambers formed in the casing 1, 20 and 21 being pistons adapted to be reciprocated respectively in the chambers 18 and 19; the piston rods 20$^a$, 21$^a$ respectively of the pistons 20 and 21, in the example shown, are guided at their upper ends in recesses, respectively 22, 23, in the cover 24 of the valve casing 1. 25 is an enlargement or cross head formed on the piston rod 20$^a$ the said enlargement or cross head being slotted through to receive the right-hand arm of the lever 26 which is fulcrummed on the fixed pivot or fulcrum pin 27, the left-hand arm of the said lever 26, as shown, extending into a slotted part or enlargement 28 provided on the rod 21$^a$ of piston 21. The enlargement or slotted cross head 25 of the piston rod 20$^a$ is suitably formed to provide a guide or runway 25$^a$ for a suitable roller or movable bearing 29 interposed between and bearing against the runway 25$^a$ and the lower side or edge of the right-hand arm of the lever 26, the said roller or movable bearing 29 being pivotally connected by a suitable pair of links 30 to the arm or lever 31 fixed on the shaft 32 carried in suitable bearings in or mounted on the casting constituting the valve casing 1, one end of the said shaft 32 extending through a suitable packing gland to the exterior of the casing. The end of the shaft 32 which projects outside the casing 1 is operatively connected in any suitable manner to the means provided for transmitting the movements of the vehicle body due to loading and unloading to the roller or movable bearing 29 through the arm 31 and links 30 for the purpose of altering the leverage of lever 26 and consequently controlling or regulating the action of the valve according to the load upon the bearing springs of the vehicle. As shown in Fig. 1 an arm 33 is fixed at one end to the projecting end of the shaft 32 and the other end of this arm may be connected by the rod 34 (Fig. 3) to one end of the lever 35 having a fixed fulcrum at 36, for example as shown on a bearing or bracket secured to the spring buckle 37 the other end of the lever 35 being fulcrumed at 38 to a bearing or bracket 39 secured to the solebar 40 of the vehicle. The lever 35, or its equivalent as shown more or less diagrammatically in Fig. 3, is preferably a two-part lever the parts of which are resiliently connected together by means of a coiled spring indicated at 41 with a bolt or rod 41$^a$ extending through the spring and through holes in the two parts of the lever the lower end of the spring bearing on top of one of the parts of the lever and the upper end of the spring bearing against a washer or cross-head suitably secured, for instance by a nut, on the bolt at or adjacent the upper end thereof the head on the lower end of the bolt bearing against the lower side of the other part of the lever. As shown one end of each part of the lever 35 is bent towards the other part so as to constitute fulcrums, the arrangement being such that the two parts of the lever can have a rocking or opening and closing movement relatively to each other. It is to be noted that in Fig. 3 (for convenience in illustration) the casing 1 of the valve device is shown in the reverse position to that shown in Fig. 1.

The pistons 20 and 21, as shown, are provided with packing rings for preventing leakage of air past the pistons.

As shown in Fig. 1 the fixed fulcrum 27 of the lever 26 is mounted in a bearing or bracket 27$^a$ having a stem which extends through a hole in the cover 24 and is secured thereto by means of a nut. 26$^a$ is a flat spring secured at one end to the top of the lever 26 the other end of said spring bearing against the upper end of the slotted enlargement or cross-head of the piston rod or stem 20$^a$, the spring 26$^a$ thus serving to maintain the right hand arm of the lever 26 in steady operative contact with the roller or movable carriage 29 and the left hand arm of said lever in steady operative contact with lower end or face of the slotted part or head 28 of the piston rod 21$^a$.

Referring to Fig. 2 which shows an embodiment of a pressure regulating valve device according to this invention designed for use with vacuum brake apparatus, in this case instead of the pistons 20 and 21 of the valve device shown in Fig. 1, being provided with packing rings, diaphragms 42 and 43 are employed, these diaphragms being held at their edges between upper and lower parts of the valve casing marked respectively 1 and 1$^a$, guide rods or stems 44, 45 being provided on the said pistons these guide rods working in suitable guides in the valve casing as shown. A suitable non-return valve 46, which may be a ball valve similar to those usually employed in vacuum brake apparatus, is fitted in the piston 21 and is arranged so that when air is being exhausted from the train pipe and consequently from the chamber in the valve casing in which the valve 9 is located and from the brake cylinder, air will also be exhausted from the space in the casing 1 above the pistons 20, 21 so that the vacuum or partial vacuum created in the train pipe and brake cylinders will also be created in the space above the pistons 20, 21. Otherwise the construction and arrangement of the valve device shown in Fig. 2 and the method of connecting it to the means provided for transmitting movements of the vehicle body or underframe due to loading and unloading are or may be identically the same as described with reference to the valve device shown in Fig. 1.

In Fig. 4 which shows diagrammatically an application of the valve device (shewn in Fig. 2) to a vehicle fitted with vacuum brake apparatus, 47 is the usual train pipe, 48 the brake cylinder, 49 the pipe connection from the train pipe 47 to the inlet 2 of the valve casing, 50 the pipe connection from the outlet 5 of the valve casing to the usual cylinder valve 51 through which air is admitted to and exhausted from the brake cylinder 48 in the usual manner. The method of connecting the actuating spindle or shaft 32 of the adjustable roller or bearing 29 (Fig. 2) to the lever 35 (Fig. 4), by which the movements of the vehicle body or underframe relative to the springs, due to loading and unloading of the vehicle, are transmitted to the said movable carriage for altering the leverage between the diaphragms 42 and 43, is or may be the same in Fig. 4 as already described with reference to Fig. 3.

Instead of the pistons 20, 21 (Fig. 1) diaphragms might be employed if desired.

It will be understood that the lower part 1$^a$ of the casing of the pressure regulating valve device shewn in Fig. 2 is provided with a flange corresponding to the flange 1$^b$ on the upper portion 1 of the casing, and that these two flanges would be secured together for instance by means of studs or bolts and nuts.

In the case of bogie vehicles the valve devices shewn in Figs. 1 and 2 should be fitted near the bolsters, while in the case of four-wheeled vehicles they should be preferably fitted near the bearing springs, the valve casings being suitably secured in any convenient manner to suitable parts of or fixed to the vehicle underframe. In fitting the valve device to a vehicle the parts operatively connected with the movable or sliding bearing 29 (Figs. 1 and 2), for transmitting movements thereto, must be arranged so that the said moveable or sliding bearing is in position nearest to the fixed fulcrum 27 of the lever 26 when the vehicle is empty, so that as the vehicle is being loaded up the said moveable or sliding carriage or bearing 29 will be moved further from the fulcrum 27, thus altering the ratio of leverage between the pistons 20 and 21 (Fig. 1) or diaphragms 42, 43 (Fig. 2), the arrangement being such that the moveable or sliding bearing 26 will be in its farthest position from the fulcrum 27 when the vehicle is fully loaded.

The spring 11, Fig. 2, tending to hold the valve 9 in the closed position, while sufficiently strong for that purpose is not strong enough to prevent the air pressure in the brake cylinder moving the valve off its seat, i. e., to the open position, so as to permit the air in the brake cylinder to escape past the valve 9 when the brakes are being released in the usual way, the air thus exhausted from the brake cylinder passing out through the connection 2 of the valve casing and thence to atmosphere through the usual exhaust ports of the triple valve. Similarly the corresponding spring 52 in Fig. 2 is such as to permit air to escape from the brake cylinder when the brakes are being released or "set" in the usual manner by exhausting air from the train pipe and brake cylinder.

The working is briefly as follows:—

Referring to Figs. 1 and 3, in applying the brakes compressed air from the auxiliary reservoir 8 on the vehicle passes as usual through the cylinder supply port of the triple valve and thence through the pipe 3 (Fig. 3) and inlet connection 2 of the regulating valve device into the chamber or space therein in which the valve 9 is located; the compressed air thus admitted to the valve device acts upon the piston 20 forcing it upward and thus, through the moveable roller or bearing 39, lever 26, piston rod 21ª and piston 21 moves the valve 9 off its seat 10 so that the compressed air admitted to the valve device will flow past the valve 9 and thence through the ports 16, outlet 5 and pipe 6 (Fig. 3) connected with the usual air supply pipe to the brake cylinder 7, into the said cylinder. When the air pressure in the brake cylinder becomes sufficient the piston 21, the pressure area of which is subjected to the pressure obtaining in the brake cylinder, will, owing to the leverage obtaining between the pistons 20 and 21, by means of the lever 26 and the adjustable or moveable bearing 29, be moved upwards (away from the stem 12 of the valve 9) against the pressure of air acting on the piston 20 with the result that the valve 9 will close and thus shut off further admission of air to the brake cylinder.

The pressure required to move the piston 21 against the resistance offered by the piston 20 depends upon the leverage obtaining between the pistons 20 and 21, or, in other words upon the distance the moveable roller or bearing 29 is away from the fixed fulcrum 27 of the lever 26; for instance if air at 60 lbs. pressure is admitted through the inlet 2 to the casing of the valve device then, assuming the leverage between the piston 21 and piston 20 to be, as shewn, 1 to 3 or approximately so then a pressure of approximately 20 lbs. acting on the piston 21 will be sufficient to move this piston against the resistance of the piston 20 and the valve 9 will therefore close when the air pressure in the brake cylinder reaches 20 lbs; if, however, the leverage is 2 to 3 then the valve 9 will close at, or approximately at, 40 lbs. pressure in the brake cylinder, and so on until the moveable roller or bearing 29 has been moved to its farthest position from the fulcrum 27 so that the leverage becomes 1 to 1, whereupon the full pressure of 60 lbs. will be obtained in the brake cylinder.

As already explained the ratio of leverage as between the pistons 20 and 21 is determined by the position of the moveable roller or bearing 29 relative to the fixed fulcrum 27 of the lever 26, and the position of the bearing 29 relative to the said fixed fulcrum is determined by the weight of the vehicle or of the vehicle and its load upon the bearing springs.

The working of the valve device shewn in Fig. 2, for vacuum brake apparatus, is the same as above described with reference to the valve shewn in Fig. 1, it being however understood that in the case of the valve shewn in Fig. 2 vacuum or partial vacuum is at all times maintained in the space or chamber of the casing 1 above the diaphragms 42 and 43 by means of the nonreturn valve 46, so that when air at atmospheric pressure is admitted through the inlet 2 of the valve casing it will actuate the diaphragm 42 so as to transmit movement through the diaphragm 43 to the valve 9 for opening the same; also it will be understood that when the pressure in the brake cylinder has become sufficient the diaphragm 43 will, according to the leverage obtaining between the diaphragms 43 and 42 as determined by the position of the moveable roller or carriage 26, be actuated so as to permit the valve 9 to close and shut off further admission of air to the brake cylinder.

The spring 11 in the example shewn, should be such that it would just "float" the valve 9 against its seat 10 where it would be held by the pressure of air admitted to the valve casing until the pistons 20 and 21 (or diaphragms 42, 43) have been actuated as hereinbefore described for opening the valve.

Further the construction and arrangements may be such that the valve 9 when fully open would be about a quarter of an inch off its seat 10, and that the stroke of the pistons (or diaphragms) would be about three eights of an inch, a suitable amount of clearance being left between the piston 21 (Fig. 1) or diaphragm rod 45 (Fig. 2) and the stem 12 of the valve when the valve is in the closed position.

Instead of the non-return valve 46 (Fig. 2) being fitted to the diaphragm 43 as hereinbefore mentioned, this valve may be fitted to the portion of the main valve casing between the diaphragms 42 and 43 as indicated by the dotted line position of the valve marked 46; in this case the casing of the non-return valve would be in communication, through a port in the main casing, with the chamber below the diaphragm 43 which chamber would in this case be enlarged as indicated by dotted lines.

Finally I wish it to be understood that Figs. 1 and 2 of the drawings are more or less, indeed mainly, diagrammatic views intended to illustrate the general principle and action of the valve device according to this invention which contemplates any suitable alterations in or departures from the construction and arrangement of the parts as shewn in these figures.

What I claim as my invention and desire to secure by Letters Patent is:—

1. In railway brake apparatus, a braking regulator comprising a casing having two piston chambers, a valve controlling the passage of air through the casing, pistons slidable in the piston chambers, one piston being adapted to open the said valve and the other piston being provided with a crosshead having a runway, a lever mounted on a stationary fulcrum pivot and operatively connected with the piston that opens the valve, and having one end portion arranged in the said runway, and a movable bearing member arranged between the said end portion of the lever and the runway and having its distance from the said pivot controlled by the load depression of the car-body, and operating to vary the effective brake action in proportion to the load.

2. A braking regulator as set forth in claim 1, and having a spring which holds the end portion of the lever in engagement with the said movable bearing member.

3. A braking regulator as set forth in claim 1, the said movable bearing member being formed of a revoluble roller the periphery of which is engaged pivotally by the lever and the runway.

In testimony whereof I affix my signature.

ALBERT BULBICK.